United States Patent Office 2,922,503
Patented Jan. 26, 1960

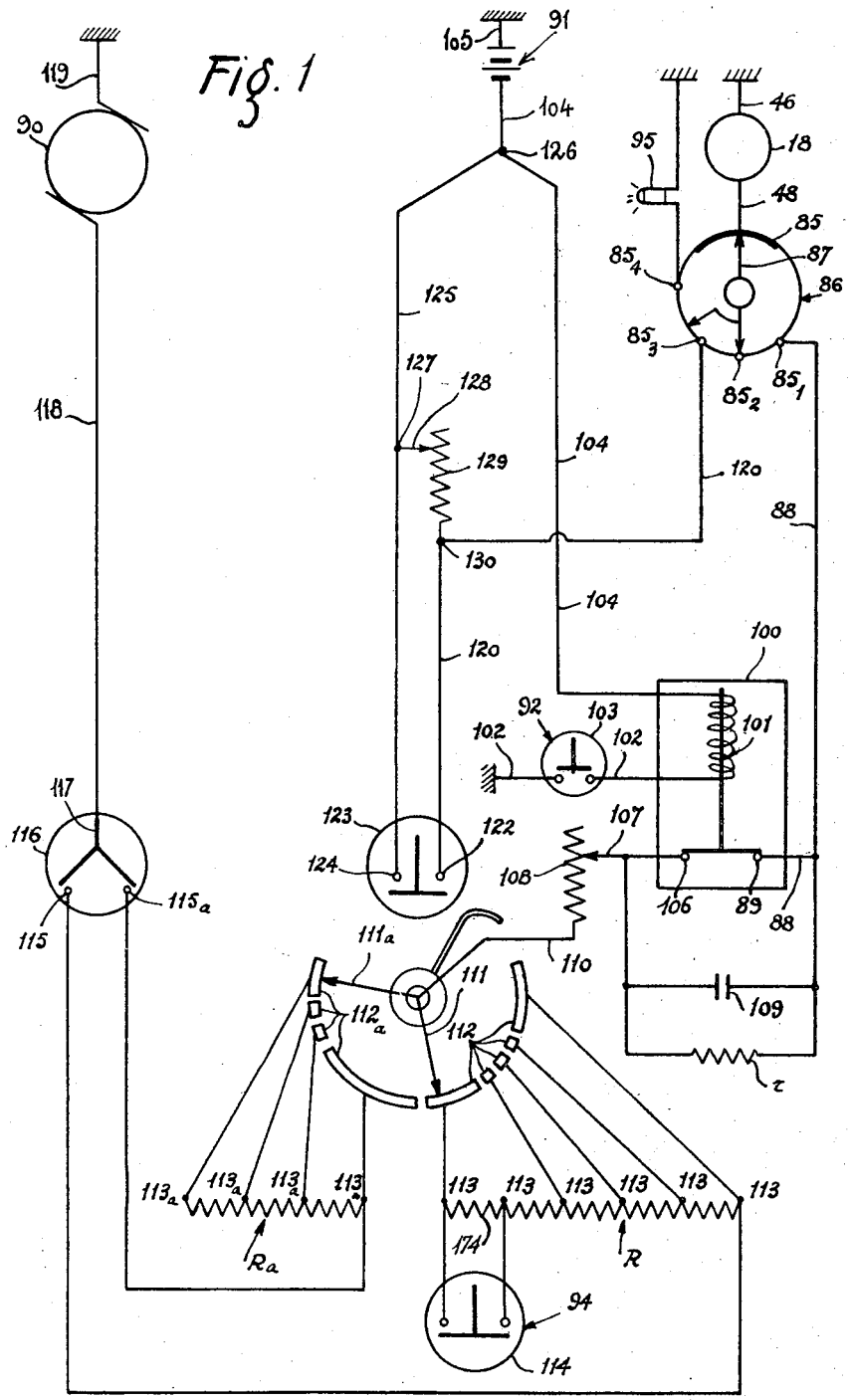

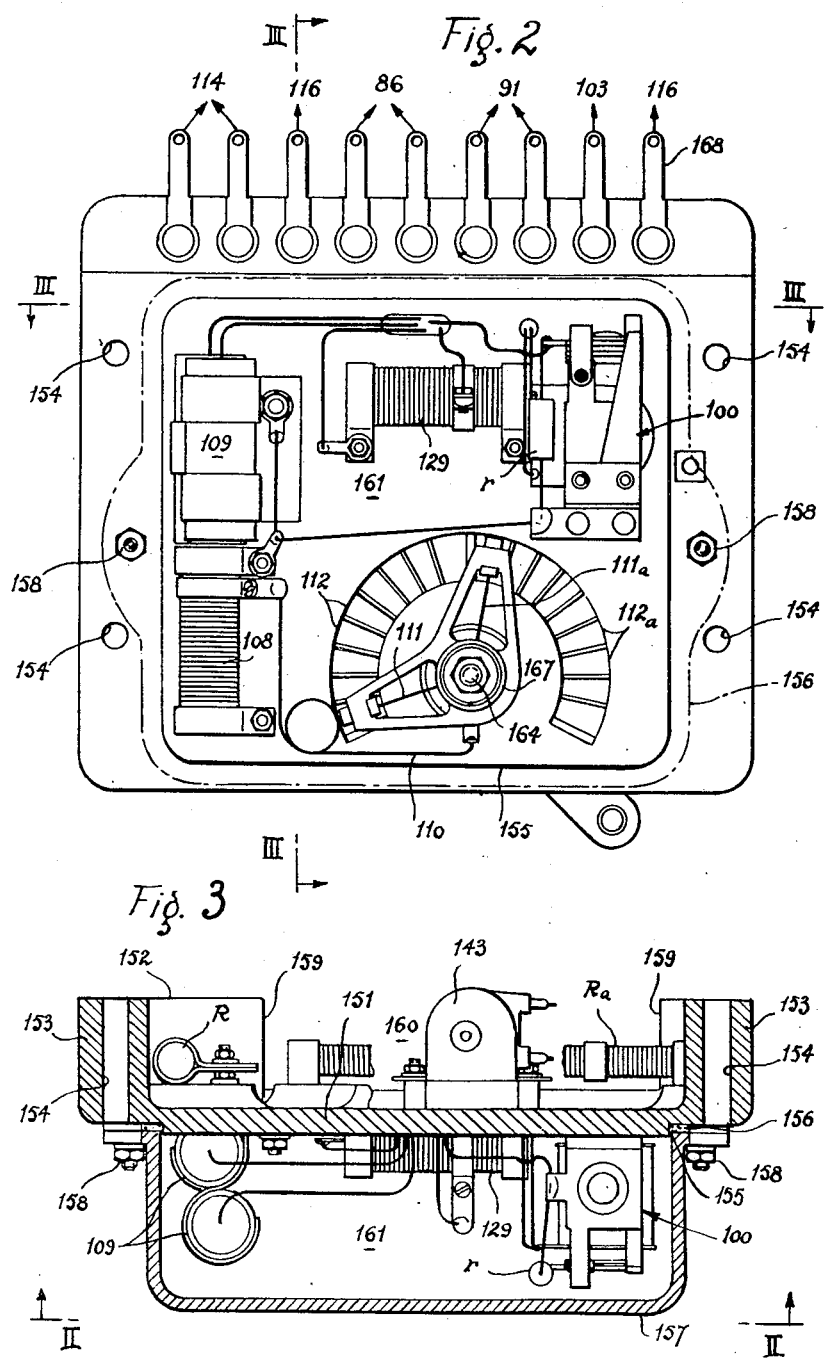

2,922,503

POWER TRANSMISSION SYSTEM

Jean Maurice and Michel Rist, Paris, France, assignors to Societe Anonyme Française du Ferodo, Paris, France, a corporation of France Application December 17, 1957, Serial No. 703,369

Claims priority, application France November 17, 1953

5 Claims. (Cl. 192—.052)

The present invention is a continuation-in-part of our co-pending application No. 469,261 filed on November 16, 1954, now Patent No. 2,897,933 dated August 4, 1959 and relates more particularly to an automobile vehicle power transmission system having an engine, a generator driven by the engine, a change-gear box driven by the engine, lever means for shifting gears in the box, an accelerator means for selectively increasing and decreasing the speed of the engine and a battery wherein a electromagnetic clutch is provided and operates between the engine and the gear-box and is selectively energized by circuits from the generator and the battery.

An object of our invention is an accelerator-controlled variable resistance means in at least one of these circuits to decrease the resistance progressively as the accelerator is moved for increasing the engine speed wherein said variable resistance means has a circular row of studs each connected to a point of a resistor and a rotatable contact unit concentric with said row and operably connected to said accelerator control.

Another object of our invention comprises said variable resistance means in the generator circuit and an adjustable resistance in the battery circuit, an accelerator-actuated switch being connected for short-circuiting said adjustable resistance when the accelerator is advanced to a predetermined position.

Another object of our invention comprises a driver actuated reversing switch for selectively energizing the clutch either by the dynamo circuit or by the battery circuit wheerin the lever switch means and the variable resistance means are operative in both circuits and are located between the reversing switch and the clutch.

Another object of our invention comprises a casing which houses the variable resistance means and the lever switch means, a partition defining in the casing an open sub-jacent compartment and an air-tight but readily accessible compartment, wherein the variable resistance means is located in the open compartment and the lever switch means is located in the air-tight compartment.

Further objects, features and advantages of the invention will be brought out in the description which follows below of forms of embodiment of the invention chosen by way of example with reference to the attached drawings in which:

Fig. 1 is an electrical diagram of the supply circuit for the operating coil of the clutch;

Fig. 2 is a view in elevation of a casing intended to receive electrical members of this circuit, following the arrows II—II of Fig. 3, the lid of the casing being removed;

Fig. 3 is a view of the casing with the lid shown in cross-section following the line III—III of Fig. 2;

Figure 5:
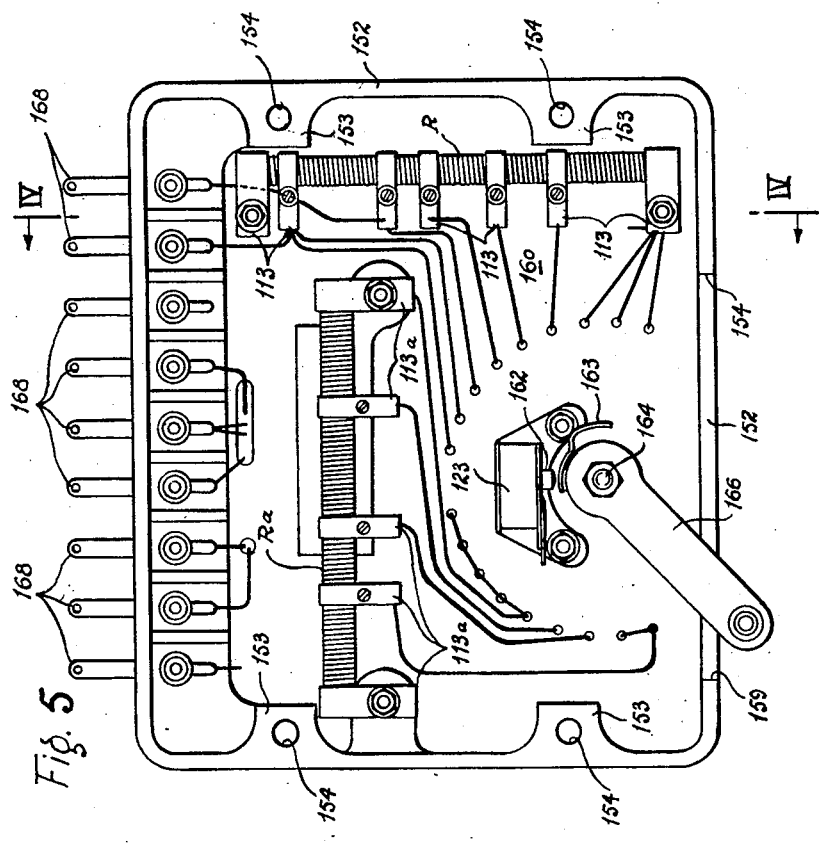
Fig. 5 is a view of the casing in elevation, following the line V—V of Fig. 4.
Figure 4:
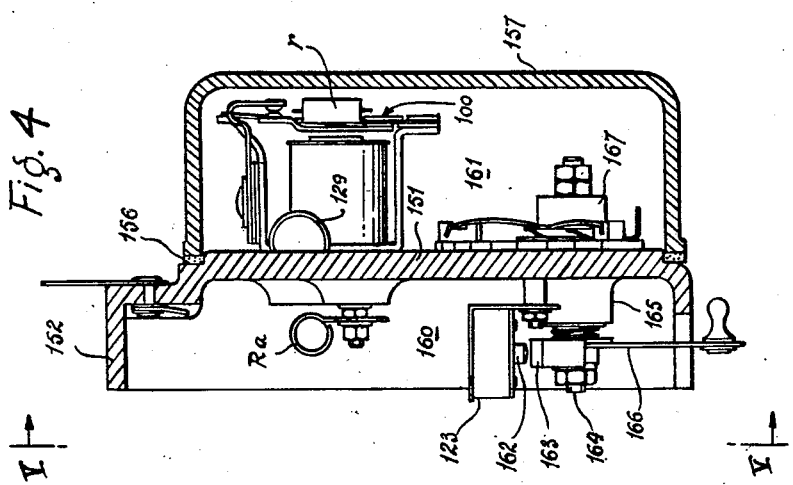
Fig. 4 is a view similar to that shown in Fig. 3, but in cross-section, taken along the line IV—IV of Figs. 2 and 5.

Reference will be made at first to Fig. 1 in which are illustrated the current supply circuits of the coil 18 of the clutch. There is shown at 90 the dynamo of the vehicle driven from the crank-shaft of the engine, at 91 the accumulator battery, at 92 a gear-changing lever and at 94 the air-choke mixture control. It is seen at 46 the conductor of the earth-return circuit of the clutch coil 18 and at 48 the conductor for supplying current to the coil 18.

The conductor 48 is connected to the common terminal 85 of a double reversing switch 86 having three positions, and which is mounted on the dashboard of the vehicle to be actuated by the driver.

The moving finger 87 of the double reversing switch 86, which is always connected to the common terminal 85, may be placed at will on one of the three contact studs of the double reversing switch, $85_1$, $85_2$, $85_3$. The contact stud $85_1$ is coupled to a circuit supplied from the dynamo 90; the contact stud $85_2$ is insulated and corresponds to the total cut-off of all supply of current to the operating coil 18 of the clutch; the contact stud $85_3$ is connected to a circuit supplied from the battery 91. In addition, there is provided a contact stud $85_4$ arranged so as to be connected to $85_3$ when the finger 87 is placed on the stud $85_3$. The contact stud $85_4$ is connected to earth through the medium of a filament of an indicator lamp 95.

The contact stud $85_1$ of the dynamo circuit is connected through a conductor 88 to one terminal 89 of a relay 100, the energising coil 101 of which has one of its ends connected to earth through a conductor 102 comprising a switch 103 which is operated by the gear-changing lever 92, whilst the other end of the coil 101 is connected by a conductor 104 to the battery 91 which is connected to earth by a conductor 105. The other terminal 106 of the relay 100 is connected by a conductor 107 to a resistance 108 arranged so as to be adjustable in such manner that the force of the electro-magnetic clutch always remains appropriate, taking account of the state of wear of the friction linings. A condenser 109 and a resistance $r$ are mounted in parallel with the relay 100 in order to avoid any deterioration of the contacts.

The resistance 108 is connected by a conductor 110 to a moving finger of a rheostat having two branches 111 and 111a and directly or indirectly operated as a function of the position of the accelerator control. The two branches 111 and 111a are respectively and simultaneously applied to the contact studs 112 and 112a of two series of fixed contact studs.

The studs 112 of a first series are, in the example shown, five in number and are connected to various points 113 of a resistance R. A suitable end portion 174 of this resistance is shunted by a switch 114 which is actuated as a function of the position of the control knob 94 of the choke.

The contact studs 112a of the second series are, in the example shown, four in number and are connected to various points 113a on a resistance Ra.

The point 113 located at the end of the resistance R, opposite to the points connected to the switch 114 and a point 113a at the extremity of the resistance Ra, are respectively connected to the terminals 115 and 115a of an automatic reversing switch 116. The moving finger 117 of this switch is connected by a conductor 118 to the dynamo 90, which is itself connected to earth through a conductor 119, and is operated in dependence on the position of the gear-box in such manner as to connect the branch 111 through the intermediary of the whole, a part, or none of the resistance R to the dynamo 90, when the gear-box has its first gear or its reverse gear engaged, and to connect the branch 111a through the intermediary of the whole, a part, or none of the resistance Ra to the dynamo 90, when the gear-box is in the position of second gear, third gear and other higher combinations, as the case may be.

The moving finger, the two branches 111, 111a of which move by equal distances, is preferably mounted to rotate, the contact studs 112 and 112a being mounted along an arcuate circular row around the said finger. The latter is rotatably driven by a rod system or other means responsive to variations in the position of the accelerator, so that for the lower gears (first gear, reverse) as well as in the case of the higher gears (second, third), the resistance introduced into the circuit of the dynamo is high when the accelerator is not depressed and is progressively reduced to zero as the accelerator is progressively further depressed.

A dynamo circuit of this kind, which is set in operation when the finger 87 of the double reversing switch 86 is placed on the contact stud $85_1$, thus comprises automatic regulating means which permit of a progressive and efficient operation of the clutch.

The other contact stud $85_3$ of the double reversing switch 86, which connects the circuit to the battery, is connected to a conductor 120 coupled to a terminal 122 of a switch 123. The latter is operated in dependence on the position of the accelerator control and is preferably directly operated by the angular movements of the support of the double finger 111, 111a, in such manner as to remain open as long as the position of the accelerator has not reached that for which the engine no-load speed is less than about 1500 R.P.M., and to close beyond the said position. The other terminal 124 of the switch 123 is connected by a conductor 125 to a point 126 on the conductor 104. A point 127 on the conductor 125 is connected by a conductor 128 to a resistance 129 arranged so as to be adjustable in such a way that the clutch force, taking account of the state of wear of the friction linings, is slightly greater than the force necessary to transmit the torque produced by the compression of the engine. The resistance 129 is connected to a point 130 on the conductor 120.

Under normal conditions of operation which do not require the use of the choke 94, the switch 114 is closed. When the engine of the vehicle has started up, the moving finger 87 is brought on to the contact stud $85_1$ of the double reversing switch 86. The indicator lamp 95 does not light up. The vehicle being stopped with the engine on slow-running speed, the dynamo generates little current whilst the resistance R, which is wholly in circuit with the exception of the portion short-circuited by the switch 114, reduces this current output still further. The clutch is disengaged and the vehicle remains stationary. The first gear is engaged and the accelerator is depressed. The output of the dynamo increases, whilst the branch 111, passing over the contact studs 112 successively cuts out portions of the resistance R. This produces a progressive engagement of the clutch. The operation of the gear lever 92 when engaging the second gear, closes the switch 103 and breaks the circuit. The clutch is instantly disengaged. At the same time, the finger 117 of the reversing switch 116 leaves the contact stud 115 in order to make contact with the stud 115a. Increase in speed is effected progressively by virtue of the interposition of the resistance Ra, which is of lower value than R and is cut-out in stages during the acceleration period. The same thing is true for the engagement of the third gear and for changing down through the gears.

When the engine is cold, the choke knob 94 is pulled out. This enables the whole of the resistance R to be inserted during starting, including the section 174 corresponding to the switch 114. The slow-running speed is thus accelerated, but the resistance 174 is so chosen that the vehicle, which is then cold, is not driven. It will be observed that after a pre-determined travel of the accelerator, the supplementary resistance 174 is cut-out. This enables the user to run for as long as may be necessary with the choke in operation without giving rise to premature slip. Only the speed at which the dynamo is switched-in is slightly increased.

When the vehicle is stopped and it is desired to leave it parked with a degree of safety replacing or increasing that obtained from the hand-brake, the finger 87 is placed on the contact stud $85_3$. As the accelerator is not depressed, the switch 123 is open. The coil 18 is thus supplied from the battery 91 with a current controlled and reduced by the resistance 129. The indicator lamp 95 lights-up feebly. The vehicle is then braked in its position by the engine itself.

In case of break-down of the dynamo, or if it is desired to start-up the engine by driving it from the vehicle, the finger 87 is also placed on the contact stud $85_3$. When the accelerator has been sufficiently depressed, the switch 123 short-circuits the resistance 129. After a period of slip, the clutch thus becomes progressively fully engaged. The user is warned of this condition by the increased brilliance of the indicator lamp 95.

The relay 100, the condenser 109, the resistance r, the resistance 108, the switch 123, the rheostat 112, 112a, the resistances R and Ra, the resistance 129 and eventually the relay 133, are assembled together and housed in a casing mounted under the bonnet of the vehicle. An example of construction of this easing is shown in Figs. 2 to 5, to which reference will now be made.

It will be seen from Figures 2 to 5 that the casing or control box comprises a rectangular plate 151 provided with a peripheral edge 152, the assembly 151, 152 being preferably made of insulating plastic material and having the shape of an open box. It will be noted from Fig. 10 that the edge 152 has a wide notch at 159. The edge 152 is provided with four internal bosses 153 pierced with holes at 154 for the application of means for fixing the control box to the chassis. The face of the plate 151 opposite to the edge has a rectangular rebate 155 around which are disposed a joint 156 and a deep cover 157. The latter is detachably mounted in position on the plate 151 by means of two screw nuts 158.

The box thus constructed has two separate spaces or compartments: a space 160, ventilated at 159 but not readily accessible and closed in by the edge 152; and an air-tight and readily accessible compartment 161 comprised within the interior of the cover 157, the two spaces 160 and 161 being adjacent and separated only by the plate 151.

In the ventilated and not very accessible space 160 are mounted the robust electrical components, which are regulated once and for all, or which have a tendency to heat-up.

On the other hand, in the air-tight and accessible space 161 are mounted the delicate electrical components which require to be protected against dust and moisture, and which require periodic adjustment.

There will be recognized in the space 160 the two resistances R and Ra which are robust and not especially delicate and which develop heat during their operation; they are provided with collars 113 and 113a which are suitably set in position once and for all. In the space 160 will also be seen the switch 123, and at 162 a push-button for operating this switch. With the push-button 162 is associated a blade 163 having a boss to form a cam and fixed to a shaft 164 rotatably mounted in a self-lubricating bearing provided in a boss 165 on the plate 151. A lever 166 is rigidly fixed to the shaft 164 and passes through the slot 159 in the edge 152. This lever is controlled by a system of rods in dependence on the position of the accelerator control. The double finger 111 and 111a is supported by the shaft 164 on the side of the space 161. To this end, an insulating sleeve 167 is provided on the shaft 164 and carries a collector washer connected to the branches 111 and 111a. This washer is elastically pressed against a further washer anchored to the plate 151 and connected to the conductor 110.

The contacts sliding on the contact studs 112 and 112a and the contact studs themselves are thus arranged inside the air-tight space 161. There will also be recognised in this space 161, the relay 100, the condenser 109, the resistance r and the wear-compensating and parking resistance 108 and 129. The interior wiring of the control box terminates in terminals 168 to which are connected the cables coupled to the choke switch 114, the reversing switch 116 of the gear-box, the double reversing switch 86, the battery 91 and the switch 103 of the gear lever.

The convenient and compact construction of the control box thus constituted will be appreciated, as will also the efficient protection which it gives to the electrical components. In particular, the condenser and the double rheostat are protected against humidity and dust, the wear-compensating and parking resistances 108 and 129 helping to drive out moisture from the air-tight space 161. On the other hand, the heat which is developed in the resistance R and Ra, and which would be excessive is dissipated by means of the opening 159. The dimensions of these resistances R and Ra may thus be reduced, which is an advantage from the point of view of production cost, without any risk of inadmissable increase in temperature.

It will also be noted that the control of the rheostat and of the switch 123 is very simple and has practically no risk of failure. In addition, there may be easily added to the shaft 164 any other control which it may be desired to make dependent on the position of the accelerator. The control box also has the advantage of being adaptable to any direction of operation of the accelerator control by a simple modification of the wiring.

Figure 6:
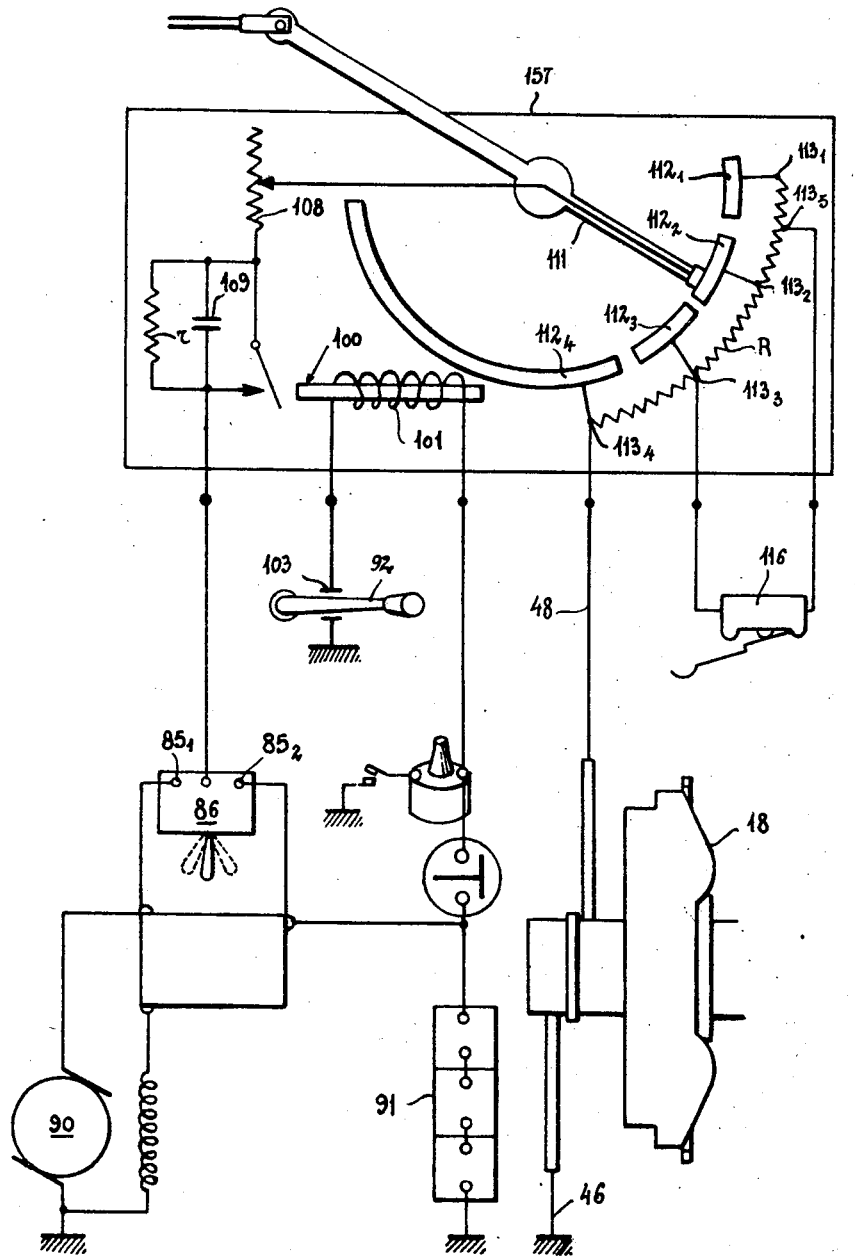
Fig. 6 is a diagram of a modification of the clutch circuit.

Reference will now be made to Fig. 6 wherein a modification of the clutch circuit of Fig. 1 is shown. The arrangement of Fig. 6 is similar to that of Fig. 1 and the same reference numbers designate similar elements in Fig. 6 and in Fig. 1. It is to be noted that in Fig. 6 the rheostat 111 is simple with a single set of studs $112_1$, $112_2$, $112_3$, $112_4$ and a single set of resistance means R and is located between the reversing switch 86 and the clutch coil 18 while the changing gear lever relay 100 is also located between the switch 86 and the coil 18.

It is a part of the single resistance R, for instance comprised between a point $113_5$ and the point $113_3$ which is shunted by the switch 116. The point $113_5$ is comprised between the points $113_1$ and $113_2$. The switch 116 is as previously sensitive to the position of the vehicle gear-box and is open or closed according as the gear-box is in first and reverse gear or is in second gear, third gear and other higher combinations.

The total resistance $113_1$—$113_4$ is so chosen as a progressive engagement of the clutch is obtained when starting. The resistance $113_2$—$113_4$ is comprised between 40% and 50% of the total resistance $113_1$—$113_4$. The resistance $113_3$—$113_4$ is comprised between 5% and 15% of the total resistance. The resistance $113_1$—$113_5$ is comprised between 35% and 40% of the total resistance.

A high progressivity of the clutch is obtained in first gear and in reverse gear. When the accelerator pedal is depressed and moves the member 111 the resistance of the rheostat is at first $113_1$—$113_4$, then $113_2$—$113_4$, then $113_3$—$113_4$ and then nil, i.e. 100% and 45% and 10% and nil of the total resistance. In second gear and higher combinations of the gear box the resistance is at first 50% and 20% and 10% and nil of the total resistance.

In normal operation the switch 86 is put on the dynamo stud $85_1$ and the engine speed is a factor of progressivity of the engagements of the clutch obtained by the resistance R. It is to be noted that when the switch 86 is put on the battery stud $85_2$ the resistance R still ensures a certain progressivity of the engagements and the gear changing lever switch 100 is still operative in the circuit feeding the clutch coil 18.

What we claim is:

1. In a power transmission system having an engine, a generator driven by the engine, a change-gear box driven by the engine, lever means for shifting gears in the box, an accelerator means for selectively increasing and decreasing the speed of the engine and a battery, the combination comprising an electromagnetic clutch, a first circuit for energizing the clutch from the generator, a second circuit for energizing the clutch from the battery, a driver actuated reversing switch for selectively energizing the clutch either by the first circuit or by the second circuit, accelerator-controlled variable resistance means operative in the two said circuits to decrease the resistance progressively as the accelerator is moved for increasing the engine speed, and switch means operative in the two said circuits operatively controlled by said lever means to open said circuits when shifting gears.

2. In a power transmission system having an engine, a generator driven by the engine, a change-gear box driven by the engine, lever means for shifting gears in the box, an accelerator means for selectively increasing and decreasing the speed of the engine and a battery, the combination comprising an electromagnetic clutch, a first circuit for selectively energizing the clutch from the generator, a second circuit for selectively energizing the clutch from the battery, accelerator-controlled variable resistance means in at least one of said circuits to decrease the resistance progressively as the accelerator is moved for increasing the engine speed, switch means in at least one of said circuits operatively controlled by said lever means to open said circuit when shifting gears, a casing, and a partition in said casing defining therein an open compartment and an air-tight readily accessible compartment, said resistance means being located in said open compartment and said lever switch means being located in said air-tight readily accessible compartment.

3. In a power transmission system having an engine, a generator driven by the engine, a change-gear box driven by the engine, lever means for shifting gears in the box, an accelerator means for selectively increasing and decreasing the speed of the engine and a battery, the combination comprising an electromagnetic clutch, a first circuit for selectively energizing the clutch from the generator, a second circuit for selectively energizing the clutch from the battery, accelerator-controlled variable resistance means in at least one of said circuits to decrease the resistance progressively as the accelerator is moved for increasing the engine speed, switch means in at least one of said circuits operatively controlled by said lever means to open said circuit when shifting gears, said variable resistance means having a circular row of studs and a rotatable contact unit concentric with said row and operably connected to said accelerator control, said studs row having a first set of studs and a second set of studs respectively connected to points of a first resistor and of a second resistor, and means connected to respond to the change-gear box position and making operative the first set when a first or reverse gear ratio is selected and making operative the second set when other gear ratios are selected.

4. In a power transmission system having an engine, a generator driven by the engine, a change-gear box driven by the engine, lever means for shifting gears in the box, an accelerator means for selectively increasing and decreasing the speed of the engine and a battery, the combination comprising an electromagnetic clutch, a first circuit for selectively energizing the clutch from the generator, a second circuit for selectively energizing the clutch from the battery, accelerator controlled variable resistance means in at least one of said circuits to decrease the resistance progressively as the accelerator is moved for increasing the engine speed, switch means in at least one of said circuits operatively controlled by said lever means to open said circuits when shifting gears, said variable resistance means having a circular row of studs each connected to a point of a resistor and a rotatable contact unit concentric with said row and operably connected to said accelerator control, and a choke control responsive switch for short circuiting a portion of said resistor.

5. In a power transmission system having an engine, a generator driven by the engine, a change-gear box driven by the engine, lever means for shifting gears in the box, an accelerator means for selectively increasing and decreasing the speed of the engine and a battery, the combination comprising an electromagnetic clutch, a first circuit for selectively energizing the clutch from the generator, a second circuit for selectively energizing the clutch from the battery, accelerator-controlled variable resistance means in at least one of said circuits to decrease the resistance progressively as the accelerator is moved for increasing the engine speed, switch means in at least one of said circuits operatively controlled by said lever means to open said circuit when shifting gears, said variable resistance means having a circular row of studs each connected to a point of a resistor and a rotatable contact unit concentric with said row and operably connected to said accelerator control and a box switch means connected to respond to the change gear box position and shunting an intermediate portion of said resistor, the said box switch means being open when a first or reverse gear ratio is selected and being closed when other gear ratios are selected.

References Cited in the file of this patent
UNITED STATES PATENTS

| | | |
|---|---|---|
| 2,318,330 | Purifoy | May 4, 1943 |
| 2,688,388 | Gill | Sept. 7, 1954 |
| 2,699,686 | Thomas | Jan. 18, 1955 |
| 2,765,670 | Winkler | Oct. 9, 1956 |
| 2,796,059 | Long | June 18, 1957 |
| 2,839,944 | Von Rucker | June 24, 1958 |